(12) United States Patent
Drath

(10) Patent No.: US 9,400,696 B2
(45) Date of Patent: Jul. 26, 2016

(54) EXECUTION OF REAL TIME APPLICATIONS WITH AN AUTOMATION CONTROLLER

(75) Inventor: Rainer Drath, Seckenheim (DE)

(73) Assignee: ABB TECHNOLOGY AG, Zürich (CH)

( * ) Notice: Subject to any disclaimer, the term of this patent is extended or adjusted under 35 U.S.C. 154(b) by 746 days.

(21) Appl. No.: 13/404,986

(22) Filed: Feb. 24, 2012

(65) Prior Publication Data

US 2012/0162235 A1    Jun. 28, 2012

Related U.S. Application Data

(63) Continuation of application No. PCT/EP2009/006120, filed on Aug. 24, 2009.

(51) Int. Cl.
*G06F 9/50* (2006.01)
*G05B 19/418* (2006.01)

(52) U.S. Cl.
CPC ........ *G06F 9/5044* (2013.01); *G05B 19/41885* (2013.01); *Y02P 90/26* (2015.11)

(58) Field of Classification Search
None
See application file for complete search history.

(56) References Cited

U.S. PATENT DOCUMENTS

| | | | | |
|---|---|---|---|---|
| 6,173,066 | B1 * | 1/2001 | Peurach et al. | 382/103 |
| 7,185,411 | B2 * | 3/2007 | Lenihan et al. | 29/433 |
| 8,041,550 | B1 * | 10/2011 | Thuerey et al. | 703/9 |
| 8,055,856 | B2 * | 11/2011 | Coon et al. | 711/152 |
| 8,295,613 | B1 * | 10/2012 | Silver et al. | 382/215 |
| 2005/0028133 | A1 * | 2/2005 | Ananth et al. | 717/105 |
| 2006/0184272 | A1 * | 8/2006 | Okazaki et al. | 700/245 |
| 2007/0061041 | A1 * | 3/2007 | Zweig | 700/245 |
| 2008/0100626 | A1 * | 5/2008 | Diard | 345/501 |
| 2008/0148171 | A1 * | 6/2008 | Ananth et al. | 715/772 |
| 2008/0198167 | A1 | 8/2008 | Bakalash et al. | |
| 2008/0276262 | A1 * | 11/2008 | Munshi et al. | 719/328 |
| 2009/0028347 | A1 * | 1/2009 | Duraiswami et al. | 381/26 |
| 2009/0074283 | A1 * | 3/2009 | Ramm et al. | 382/133 |
| 2009/0086021 | A1 * | 4/2009 | Baier et al. | 348/143 |
| 2010/0007646 | A1 * | 1/2010 | Tsuei et al. | 345/212 |
| 2010/0287556 | A1 * | 11/2010 | Munz | G06F 9/4887 718/102 |

FOREIGN PATENT DOCUMENTS

WO    WO 2008/127610 A2    10/2008

OTHER PUBLICATIONS

John D. Owens, Mike Houston, David Luebke, Simon Green, John E. Stone and James C. Phillips GPU Computing: Graphics Processing Units—powerful, programmable, and highly parallel—are increasingly targeting general-purpose computing applications, 2008, Proceedings of the IEEE, 96(5):879-899.*
Julius Fabian Ohmer, Computer Vision Applications on Graphics Processing Units 2007, Master of Information Technology Thesis, Queensland University of Technology (Australia), Chapters 7-11.*
Li Zhang, Ramakant Nevatia, Efficient Scan-Window Based Object Detection using GPGPU, 2008, IEEE Computer Society Conference on Computer Vision and Pattern Recognition Workshops, 2008. CVPRW '08, p. 1-7.*
Hae-woo Park, Hyunok Oh, Soonhoi Ha, Multiprocessor SoC Design Methods and Tools, 2009, IEEE Signal Processing Magazine, 26(6):72-79.*
Microsoft Press, Microsoft(R) Computer Dictionary, 2002, Microsoft Press, pp. 159, 554-555, ISBN-13:978-0-7356-1495-6.*
International Search Report (PCT/ISA/210) issued on Jul. 1, 2010, by European Patent Office as the International Searching Authority for International Application No. PCT/EP2009/006120.
Masatomo Inui et al., "Using a GPU to Accelerate Die and Mold Fabrication", IEEE Computer Graphic and Applications, Jan./Feb. 2007, vol. 27, No. 1, pp. 82-88, XP-011154593.
John Rieffel et al., "Evolving Soft Robotic Locomotion in Physx", Internet Citation, Jul. 8, 2009, pp. 1-6, XP-002575545.
Bryan Walter et al., "UAV Swarm Control: Calculating Digital Pheromone Fields With the GPU", Interservice/Industry Training, Simulation, and Education Conference, 2005, Paper No. 2078, pp. 1-9, XP-002585287.
David Tarditi et al., "Accelerator: Using Data Parallelism to Program GPUs for General-Purpose Uses", International Conference on Architectural Support for Programming Languages and Operating Systems, Oct. 21, 2006, pp. 325-335, XP-002500986.
"The Peakstream Platform: High Productivity Software Development for Multi-Core Processors", Mar. 5, 2007, pp. 1-12, XP-002502799.

* cited by examiner

*Primary Examiner* — Michael J Cobb

(74) *Attorney, Agent, or Firm* — Buchanan Ingersoll & Rooney PC

(57) ABSTRACT

A method and system are provided for performing the computational execution of automation tasks with automation devices by combining one or more central processing units (CPU) and one or more Graphics Processing Units (GPU). The control tasks and/or control algorithms are executed by the single-core or multi-core control unit (CPU) and a multi-core-graphics processor (GPU) or both in parallel at the same time.

7 Claims, No Drawings

EXECUTION OF REAL TIME APPLICATIONS WITH AN AUTOMATION CONTROLLER

RELATED APPLICATION

This application claims priority as a continuation application under 35 U.S.C. §120 to PCT/EP2009/006120 filed as an International Application on Aug. 24, 2009 designating the U.S., the entire content of which is hereby incorporated by reference in its entirety

FIELD

The present disclosure relates to a method and a device for performing a computational execution of control tasks of an automation system with automation devices by means of one or more Central Processing Units (CPUs).

BACKGROUND INFORMATION

In industrial applications, a control device usually performs a variety of control tasks at the same time in parallel. Since usually more automation tasks have to be executed than CPUs are available, the simultaneous execution of the automation tasks on a single or multi-core CPU is solved by a real time system which decomposes the different automation tasks into small pieces of code which are executed sequentially. Real time behavior of parallel automation tasks is reached, for example, by a real time operating system, an interrupt system including an interrupt controller, and semaphore concepts or prioritization concepts.

Contemporary control systems additionally provide a graphical visualization of automation relevant information. This graphical visualization is used in order to display operator graphics and to provide a human machine interface. Modern graphic adapters provide a significant calculation power with dozens or hundreds of parallel calculation units. The overall calculation unit of a graphics adapter is called a graphics processing unit (GPU). However, the GPU is exclusively used for graphic applications.

Recently, much of the research and development in the graphics architecture field has been concerned ways to improve the performance of three-dimensional (3D) computer graphics rendering. Graphics architecture is driven by the same advances in semiconductor technology that have driven general-purpose computer architecture.

Many of the same acceleration techniques have been used in this field, including pipelining and parallelism. The graphics rendering application, however, imposes special demands and makes available new opportunities. For example, since image display generally involves a large number of repetitive calculations, it can more easily exploit massive parallelism than can general-purpose computations.

According to US 2008198167 A1, a computing system has been developed which is capable of parallelizing the operation of multiple GPUs supported on external graphics cards, employing a software-implemented multi-mode parallel graphics rendering subsystem.

The computing system of US 2008198167 A1 includes a CPU memory space for storing one or more graphics-based applications, one or more CPUs for executing the graphics-based applications, and a bridge circuit operably connecting one or more CPUs and the CPU memory space. The bridge circuit includes an integrated graphics device (IGD) having one or more GPUs.

Furthermore, the computing system of US 2008198167 A1 includes one or more graphics cards supporting multiple GPUs and being connected to the bridge circuit by way of a data communication interface, a multi-mode parallel graphics rendering subsystem supporting multiple modes of parallel operation, a plurality of graphic processing pipelines (GPPLs), implemented using the GPUs, and an automatic mode control module.

In an illustrative embodiment of US 2008198167 A1, the IGD has one internal GPU, and the external graphics card(s) supports multiple GPUs. During the run-time of the graphics-based application, the automatic mode control module automatically controls the mode of parallel operation of the multi-mode parallel graphics rendering subsystem so that the GPUs are driven in a parallelized manner.

In US 2008276262 A1, a method and an apparatus are disclosed that schedule a plurality of executables in a schedule queue for execution in one or more physical compute devices such as CPUs or GPUs concurrently. One or more executables are compiled online from a source having an existing executable for a type of physical compute devices different from the one or more physical compute devices.

Dependency relations among elements corresponding to scheduled executables are determined to select an executable to be executed by a plurality of threads concurrently in more than one of the physical compute devices. A thread initialized for executing an executable in a GPU of the physical compute devices are initialized for execution in another CPU of the physical compute devices if the GPU is busy with graphics processing threads.

Sources and existing executables for an application processing interface (API) function are stored in an API library to execute a plurality of executables in a plurality of physical compute devices, including the existing executables and online compiled executables from the sources.

All these developments are directed to the original purpose of the graphics adapters i.e. the rendering of graphical content as images or movies stored in a computer whereat the speed of the rendering as well as the resolution have been improved tremendously. Publications in this field of technology concentrate on the improving the performance of graphic adapters in order to improve the quality and speed of the rendering.

In other words, the increase of computational capability of the electronic processing units most notably with regard to graphics adapters has not been expected, in particular not to that extent coincidentally by means of parallelization of the calculation processes. This is possible due to the fact that graphic processing units dispose of a plurality of graphic processing pipelines supporting multiple modes of parallel operation.

Recently, major vendors and/or manufacturers of graphic adapters provide programming interfaces to execute arbitrary code on the graphical unit which is not designated to graphic tasks. Complex algorithms for video transcoding, solution of differential equations or finite element analysis can already utilize the GPU power. A use in industrial applications and in particular in automation applications however is not available at present.

SUMMARY

An exemplary embodiment of the present disclosure provides a method of performing a computational execution of multiple automation tasks with automation control devices including at least one of a single-core control unit and a multi-core control unit. The exemplary method includes executing at least one of control tasks and control algorithms by at least one multi-core graphics processor unit (GPU).

An exemplary embodiment of the present disclosure provides a system which includes industrial applications and devices, and at least one of a single-core control unit and a multi-core control unit (CPU). The exemplary system also includes a multi-core graphics processor (GPU). The industrial applications and devices are configured to be subject to automation purposes and be controlled by at least one of control tasks and control algorithms being executed by (i) the at least one of the single-core and multi-core control unit and (ii) the GPU at the same time.

DETAILED DESCRIPTION

In view of the drawbacks associated with known techniques as described above, exemplary embodiments of the present disclosure provide a method and system for performing control of those plant components by utilization of one or more GPUs.

Accordingly, exemplary embodiments of the present disclosure make the computational power of the graphic processing units (GPUs) available for the control of automation systems. For example, exemplary embodiments of the present disclosure utilize the parallel architecture of multi-core GPUs, for example, the graphic processing unit of a graphic adapter, for the control of multiple, complex and distributed plant components all belonging to the respective automation system.

The computational execution of automation tasks with automation devices like Programmable Logic Controllers (PLC), Distribution Control Systems (DCS), Industrial-PCs (IPC), Programmable Automation Controllers (PAC), Robot Controllers (RC) or Motion Controllers (MC) requires usually a Central Processor Unit (CPU) which executes the instructions of the control software.

Hence, according to an exemplary embodiment of the present disclosure, the control tasks or control algorithms are executed by the single-core or multi-core control unit (CPU) and a multi-core graphics processor (GPU), or both at the same time.

Exemplary embodiments of the present disclosure are based on a principle and central idea of utilizing the parallel architecture of GPUs for the execution of real time applications on an automation device, for example, on a PLC or a robot controller. Since the number of parallel calculation units available situated on a graphics adapter in one or more GPUs exceeds the typical number of parallel tasks of an automation system, the costly effort of parallelization and management of a real time system is no longer required. The possibility of massive parallelization allows running each control task exclusively at one or more designated calculation units. This increases the available performance significantly and allows designing simplified real time architecture.

An exemplary embodiment of the present disclosure associates the majority of control tasks on at least one calculation unit.

An exemplary embodiment of the present disclosure provides a combined utilization of multi-core CPUs with the parallel calculation units of a graphics adapter namely one or more GPUs at the same time.

Examples of beneficial automation applications related to the present disclosure are described below.

For instance, a PLC or Soft-PLC can run different automation tasks or algorithms each on a separate set of calculation units and can thus provide high performance real time behavior.

Robot Controller, Motion Controller or their virtual pendants can control different axles on each a separate set of calculation units each comparable to a single task running on a single CPU.

PLCs, Robot Controllers and Motion Controllers can be combined into one automation device which runs the different automation tasks each on a separate set of parallel units.

The parallel architecture of GPUs allows a parallel execution of parallel tasks, that is simultaneously. The decomposition of automation tasks can be reduced or can be avoided. Independent control algorithms can be executed in parallel at the same time. Hence, the performance of such automation devices is enhanced impressively.

Real time concepts can be significantly simplified. The complex and time consuming decomposition of parallel tasks into a sequence of small code fragments can be reduced or avoided. This allows designing new real time architectures based on parallel single tasks running on parallel and associated calculation units.

The virtualization of one or more control devices (virtual robot controller, virtual motion controller, virtual PLC) is simplified. The additional GPU power can be used in order to increase the responsiveness and real time behavior of the device simulation.

With this disclosure, the calculation power of graphic adapters is being utilized in order to have a powerful processing unit for processing multiple single tasks in automation applications in parallel, that is, simultaneously. Since a plurality of automation applications need sufficient processing capability, the existing processing power of graphic adapters for simultaneous calculation processes by parallelization of processing pipelines.

It is to be understood that the operative functions of the present disclosure described above are performed by one or more processing units which can execute one or more computer programs containing instructions for executing the operative functions. The computer program(s) executed by the processing units are recorded on a non-transitory computer-readable recording medium constituted by a non-volatile memory (e.g., ROM, hard disk drive, flash memory, optical memory, etc.), and the processing units may also utilize a RAM (random access memory) interactively with the execution of the program(s) for carrying out the operative functions of the present disclosure.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of performing a computational execution of multiple control tasks of an automation device, wherein the automation device includes at least one of a single-core control unit and a multi-core control unit, the method comprising:
   executing the control tasks on the automation device by at least one multi-core graphics processor unit (GPU), wherein the control tasks are real time applications and each control task is run exclusively at one or more designated parallel calculation units situated on a graphics adapter in the at least one GPU.

2. The method according to claim 1, wherein the control tasks are running simultaneously on the parallel calculation units of the at least one GPU.

3. The method according to claim 1, comprising:
assigning different control tasks to a single automation device running the different tasks independently and in parallel.

4. The method according to claim 1, wherein the automation device is at least one of a robot controller and a motion controller, which is configured to control different axles each on a separate set of the calculation units.

5. A system comprising:
industrial machines and apparatuses;
an automation device, wherein the automation device comprises
at least one of a single-core control unit and a multi-core control unit (CPU); and
at least one multi-core graphics processor (GPU),
machines and apparatuses are configured to be subject to automation purposes and be controlled by control tasks being executed on the automation device by the GPU, wherein the control tasks are real time applications and each control task is run exclusively at one or more designated parallel calculation units situated on a graphics adapter in the at least one GPU.

6. The system according to claim 5, wherein the automation device is a robot controller or a motion controller, configured to control different axles each on a separate set of calculation units.

7. The system according to claim 6, wherein (i) the robot controller or the motion controller and (ii) a Programmable Logic Controller (PLC) are combined into the automation device.

\* \* \* \* \*